Aug. 16, 1938.                R. L. LEVY                2,127,064
                              BRAKE VALVE
                         Filed Sept. 8, 1936
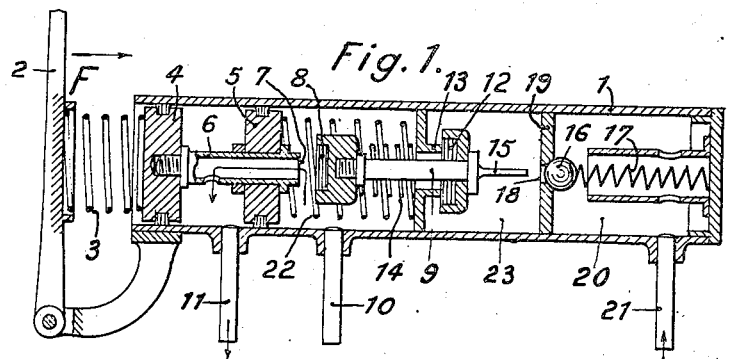
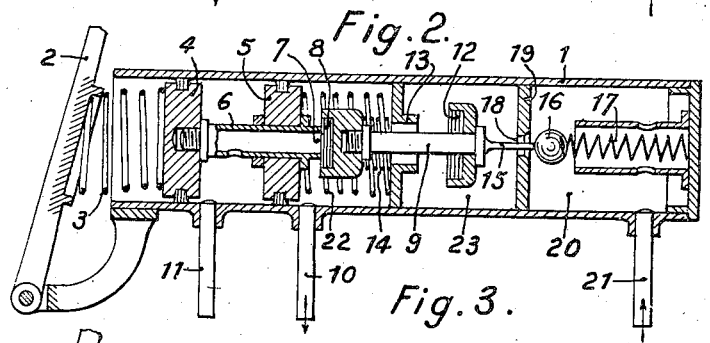
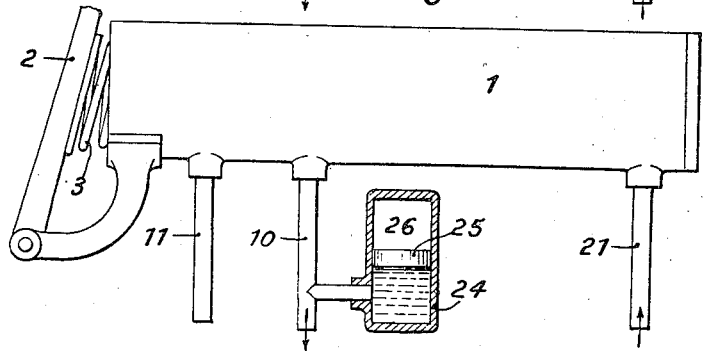
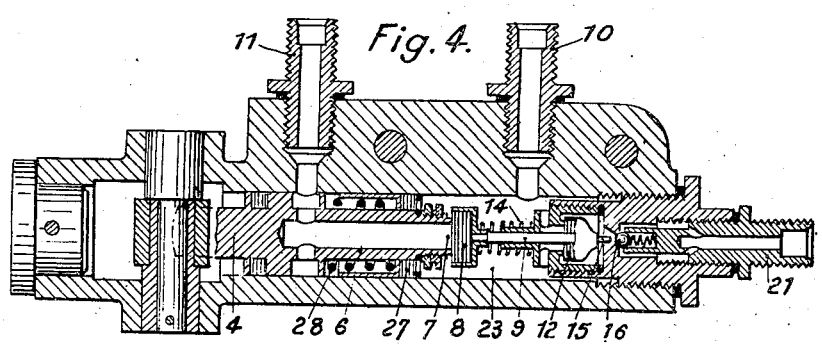
R. L. Levy
Inventor
By Glascock Downing & Seebold
Attys Patented Aug. 16, 1938

2,127,064

UNITED STATES PATENT OFFICE 2,127,064

BRAKE VALVE

René Lucien Levy, Montrouge, France, assignor to Societe d'Inventions Aeronautiques et Mecaniques S. I. A. M., Fribourg, Switzerland Application September 8, 1936, Serial No. 99,900
In France November 19, 1935

1 Claim. (Cl. 303—54)

This invention relates to hydraulic power transmission systems—especially applicable to brake mechanism on vehicles in particular—in which the motive power is furnished by a liquid under pressure from, for example, a hydropneumatic accumulator.

In known systems of this kind, the admission of the liquid under pressure into the operating pipes—brake pipe, and the like, is effected by opening a valve which, when the system is in neutral position, is kept closed and fluid-tight. When, under these conditions, the admission valve is moved away from its seat, however slightly, by a control action, the liquid under pressure flows through the narrow aperture thus opened, the seat becoming worn, in consequence, by lamination, and the fluid-tight effect gradually impaired.

The object of the present invention is to obviate this disadvantage and for this purpose, the invention comprises a distributor, in which two separate valves are provided, the one for sealing, and the other for the progressive admission of fluid. The external effort exerted for admitting the liquid under pressure into the working pipes results, in the first place in the fully opening of a first ("sealing") valve, which, when in its neutral position, completely isolates said pipes and the circuit under pressure. The said external effort, being continued, then opens a second ("progressive") valve, but only after the first valve has already been moved an appreciable distance from its seat.

The second valve may be advantageously—but not restrictively—constituted by a ball, applied against an orifice in a partition by an opposing force, for example by means of a spring.

An embodiment of the invention is illustrated in the accompanying drawing in which Figure 1 represents a section through a distributor when in neutral position; Figure 2 shows the same in the operative position; whilst Figures 3 and 4 represent the distributor in sectional elevation completed by a device which suppresses pulsation phenomena.

In the body of the distributor (for example a cylinder 1) and adapted to be moved—under the action of an outside lever 2 or a pedal or equivalent member, retracted by a spring 3 is a set of two pistons 4—5 integrally connected by a common hollow rod 6 the opening 7 at one end of which faces a seat 8 carried by a rod 9. Contact of the end of the rod 6 with the seat 8 results in shutting off the communication normally existing, when the device is in neutral position, between the brake pipe 10 and the exhaust pipe 11 leading to a tank (not shown). A sealing valve 12 is integral with the rod 9 and in its neutral position, said valve 12 is held firmly on its seat 13 by a spring 14.

The end of a finger 15, forming an extension of the rod 9, is adapted to push back a second valve ("progressive" valve) which, in this example, is constituted by a ball 16 supported, by a spring 17, against an orifice 18 in a partition 19 integral with the body 1 of the distributor.

The rear compartment 20 of the body 1 of the distributor beyond the diaphragm 19, is in communication, by way of a pipe 21, with the source of liquid under pressure, for example, a hydropneumatic accumulator (not shown).

A spring 22 may be provided, in rear of the piston 5, in order to return the latter into neutral position by operating in the same direction as the recoil spring 3 of the control member 2.

The arrangement functions in the following manner, starting from the neutral position, Fig. 1. By moving the lever 2, or equivalent means, in the direction of the arrow F, the mouth 7 of the hollow rod 6 is pressed against the seat 8, thus shutting off the communication between the operative pipe 10 and exhaust pipe 11. Then, by continuing to act on the lever 2, the sealing valve 12 is freed from its seat 13, thereby placing the operative pipe 10 in communication with an intermediate compartment 23 of the distributor. It is not until the valve 12 has moved an appreciable distance from its seat 13 that the finger 15, integral with the rod 9, acts on, and, pushes back, the ball 16 against the action of the spring 17 and against the fluid pressure. The liquid under pressure in the pipe 21 then passes between the ball 16 and the orifice 18 in the partition 19, thence into the compartment 23 and, through the wide aperture uncovered by the valve 12, into the operative pipe 10 (Figure 2). When the operating lever 2 is returned to its initial position the valve 12 is moved in the direction of its seat 13 by the spring 14 but before engaging therewith the finger 15 disengages the ball valve 16 and the latter engages upon its seat. Subsequent to the closing of the ball valve 16 the valve 12 fully seats thereby sealing the passage through the seat 13. The end of the hollow rod 6 is withdrawn from the seat 8 thereby establishing communication between the pipes 10 and 11.

The ball 16, preferably of hard steel, is practically indestructible, and, inasmuch as it rotates under the flow of the liquid under pressure, it undergoes practically no wear. This ball 16 does not have to act as a sealing member, this effect being ensured by the valve 12 which, in turn, is protected against wear owing to the fact that it is fully separated from its seat 13 when traversed by the liquid under pressure.

On the other hand, the action of the distributor may be disturbed by pulsation phenomena which, by their effect on the valve 16 during the opening stage, may set up vibrations in the operative pipe 10.

Figures 3 and 4 show, by way of example, two devices suitable for avoiding such an inconvenience.

In the case shown in Figure 3, a small vessel 24 branches off from the operating pipe 10, near the point at which it issues from the distributor 1 and houses a piston 25 above which is a space 26 serving as an air cushion which by undergoing compression, damps vibration. The air cushion might be replaced by a spring.

In the case shown in Figure 4, the same damping function is effected by an auxiliary piston 27 acted upon by a spring 28. This embodiment has the advantage, over the preceding one, of not requiring any member exterior to the actual distributor.

What I claim as my invention and desire to secure by Letters Patent is:—

In a distributing device, a casing having two passages therein, valves adapted to cooperate with said passages to control the flow of fluid therethrough, means for actuating one of said valves, and means for imparting the movement of said valve to the other valve whereby the first mentioned valve is completely opened prior to the opening of the second mentioned valve, said casing having an exhaust passage therein, and means for controlling the flow of fluid to said exhaust passage, said fluid control means including a seat integral with the first mentioned valve, and a hollow member carried by the actuating means cooperating with said seat.

RENÉ LUCIEN LEVY.